US010980370B2

(12) United States Patent
Smith et al.

(10) Patent No.: US 10,980,370 B2
(45) Date of Patent: Apr. 20, 2021

(54) BONFIRE GRILLING APPLIANCE

(71) Applicant: Spectrum Brands, Inc., Middleton, WI (US)

(72) Inventors: Jacob Daniel Smith, Monona, WI (US); Matthew Guckenberger, Oconomowoc, WI (US)

(73) Assignee: Spectrum Brands, Inc., Middleton, WI (US)

( * ) Notice: Subject to any disclaimer, the term of this patent is extended or adjusted under 35 U.S.C. 154(b) by 145 days.

(21) Appl. No.: 16/081,338

(22) PCT Filed: Feb. 23, 2017

(86) PCT No.: PCT/US2017/019037
§ 371 (c)(1),
(2) Date: Aug. 30, 2018

(87) PCT Pub. No.: WO2017/151374
PCT Pub. Date: Sep. 8, 2017

(65) Prior Publication Data
US 2019/0090689 A1 Mar. 28, 2019

Related U.S. Application Data

(60) Provisional application No. 62/301,793, filed on Mar. 1, 2016.

(51) Int. Cl.
*A47J 37/07* (2006.01)
*A47J 37/06* (2006.01)

(52) U.S. Cl.
CPC ....... *A47J 37/0709* (2013.01); *A47J 37/0676* (2013.01); *A47J 37/0781* (2013.01)

(58) Field of Classification Search
CPC .. A47J 37/067–0676; A47J 37/07–0709; A47J 37/0763
(Continued)

(56) References Cited

U.S. PATENT DOCUMENTS 4,554,864 A * 11/1985 Smith ................. A47J 37/0709
126/25 R
4,700,051 A 10/1987 Goessler et al.
(Continued)

FOREIGN PATENT DOCUMENTS

CN 204207619 U 3/2015
EP 2807967 A1 3/2014
(Continued)

OTHER PUBLICATIONS

International Search Report for co-pending PCT/US2017/019037, 5 pages, dated Jun. 19, 2017.

*Primary Examiner* — Michael A Laflame, Jr.
(74) *Attorney, Agent, or Firm* — Kagan Binder, PLLC

(57) ABSTRACT

There is provided an indoor/outdoor tabletop grill appliance which uses quartz halogen tubes as radiant heating elements to provide cooking functionality combined with the aesthetics of the outdoor grilling experience. The invention provides the advantage of various forms of cooking that also speed up the cooking process: direct heat on the food item from the quartz halogen tubes, heat reflected back from the inner surfaces of the grilling chamber and onto the food item, convection heat directed about the food item due to the grilling chamber configuration and directed heat from the slotted platen this in contact with the food item received from the halogen tubes.

15 Claims, 4 Drawing Sheets

(58) Field of Classification Search
USPC ..... 219/405, 450.1; 99/372, 451; 126/25, 27
See application file for complete search history.

(56) References Cited

U.S. PATENT DOCUMENTS

| | | | |
|---|---|---|---|
| 5,517,005 | A | 5/1996 | Westerberg et al. |
| 5,747,783 | A * | 5/1998 | Myung ................... F21S 10/02 |
| | | | 219/758 |
| 5,990,454 | A | 11/1999 | Westerberg et al. |
| 6,369,367 | B1 | 4/2002 | Maier |
| 6,417,494 | B1 * | 7/2002 | Westerberg .......... H05B 3/0076 |
| | | | 219/402 |
| 2003/0146202 | A1 * | 8/2003 | Backer ................. H05B 3/0076 |
| | | | 219/405 |
| 2008/0142503 | A1 * | 6/2008 | Li ....................... A47J 37/0676 |
| | | | 219/450.1 |
| 2011/0049125 | A1 | 3/2011 | Home |
| 2011/0163089 | A1 * | 7/2011 | Park ..................... H05B 6/6444 |
| | | | 219/679 |
| 2015/0068512 | A1 * | 3/2015 | Mehler ................. A47J 37/067 |
| | | | 126/25 R |

FOREIGN PATENT DOCUMENTS

| | | |
|---|---|---|
| KR | 100512533 B1 | 9/2005 |
| WO | 9912392 A1 | 3/1999 |
| WO | 2015044164 A1 | 4/2015 |

\* cited by examiner

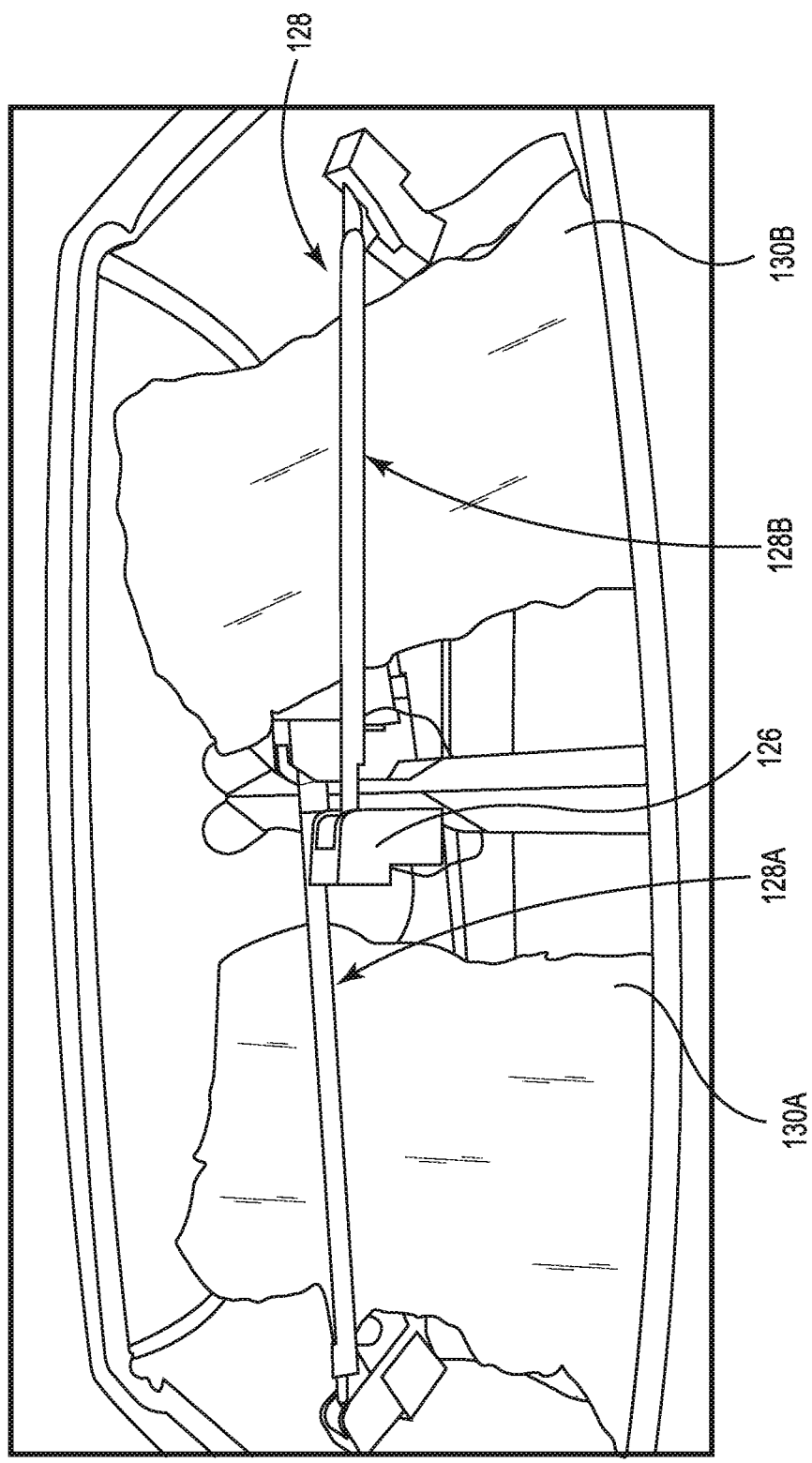

BONFIRE GRILLING APPLIANCE

CLAIM OF PRIORITY

This application claims priority to International Application No. PCT/US2017/019037, filed on Feb. 23, 2017, which in turn claims priority under 35 U.S.C. 119(e) to and the benefit of a U.S Provisional Application with Ser. No. 62/301,793, filed on Mar. 1, 2016, both applications which are incorporated herein by reference in their entireties.

FIELD AND BACKGROUND OF THE INVENTION

The invention described herein relates generally to table top grills for indoor or outdoor use.

Various types of cooking apparatus are known including barbeques, and gas and electric tabletop grilling appliances. Some indoor tabletop grills have a natural gas burner or electric heating element positioned under a grilling sheet. In some models, an exhaust system is provided adjacent (e.g., above or behind the grill) to exhaust the combustion gasses and smoke emanating from foods being cooked. These indoor barbeques or tabletop grilling appliances have several disadvantages including a connection to a pressurized propane tank or canister; a noisy exhaust system that may be needed to vent out the smoke; difficulty in accurately controlling electric heating elements when it comes to cooking temperature; and weight and lack of portability for some models.

Existing tabletop models use electric resistance heating placed under a platen or a corrugated cooking surface which makes it difficult to clean since other food particles and grease may collect while the food item is cooking. Such cooking appliances attempt to simulate the taste and look of barbequed food but have not been very successful. There is a need for a tabletop cooking grill appliance that addresses the shortcomings of the market.

SUMMARY

In various example embodiments, a design for an indoor/outdoor grill is provided which uses quartz halogen tube heaters to provide cooking functionality combined with the aesthetics of the grilling experience, resulting in food which better resembles current outdoor grills. Further, the invention provides the advantage of various forms of cooking that also speed up the cooking process: direct heat on the food item from the quartz halogen tubes, heat reflected back from the inner surfaces of the grilling chamber and onto the food item, convection heat directed about the food item due to the grilling chamber configuration and directed heat from the slotted platen this in contact with the food item received from the halogen tubes.

In one example embodiment, a new indoor/outdoor tabletop grilling appliance is provided that uses one or more quartz tubes to heat up quicker and hotter than current electric grills on the market with all of the components housed in a barbeque-style grill. In addition, by using a slotted platen or grilling plate the infrared (IR) emitted by the quartz or halogen tubes is allowed to aid in cooking foods placed on the grill. This same IR emission provides a visual glow and warmth to the grill that replicates current outdoor grills as well as providing a visual feedback for heat intensity. The design provided herein intends to capture the benefits of convection and radiant heat from the quartz tubes as well as direct heat via heating the slotted grill plate, thereby providing a very efficient and fast grilling experience. In addition, with the use of an appropriate temperature and electric controller the heat intensity from the halogen tubes will be variable (which will also be visually apparent) and will provide a pleasant charcoal-like glow.

In a related example embodiment, a tabletop grill for cooking food is provided that includes a grilling chamber having a highly reflective and low heat absorption inner surface for reflecting radiant energy to a food item positioned therein, the grilling chamber being configured to direct emitted radiant energy in a convection manner about the food item. The grill further includes a radiant energy generating assembly emitting a substantial portion of energy in the visible light range of the electromagnetic spectrum, the radiant energy assembly being positioned within the grilling chamber to direct radiant energy at the food item, the food item receiving reflected radiant energy from the inner surface of the grilling chamber and being subjected to convection heat from the emitted radiant energy. Also included is a grill member for supporting the food item that is disposed within the grilling chamber, the grill member being formed of heat conducting material that emits direct heat energy absorbed from the radiant energy assembly to the food item when in contact with the food item. In a related embodiment, the grill further includes a temperature control device to control the radiant energy assembly for controlling radiant and visible light emitted by the radiant energy assembly. In a specific embodiment, the temperature control device controls radiant and visible light emitted by a first quartz halogen tube and by a second quartz halogen tube in one or more of the selected operating states: independent, timed operation, temperature and visual intensity.

In yet another example embodiment, a grill for cooking food is provided that includes a grilling chamber having a highly reflective and low heat absorption inner surface for reflecting radiant energy to a food item positioned therein, the grilling chamber configured to direct emitted radiant energy in a convection manner about the food item. Also included is a radiant energy generating assembly emitting a substantial portion of energy in the visible light range of the electromagnetic spectrum comprised of two quartz halogen tubes mounted in a substantially end to end configuration, the radiant energy assembly positioned within the grilling chamber to direct radiant energy at the food item, the food item receiving reflected radiant energy from the inner surface of the grilling chamber and being subjected to convection heat from the emitted radiant energy. A grill member for supporting the food item is also included that is disposed within the grilling chamber, the grill member being formed of heat conducting material that emits direct heat energy absorbed from each of the quartz halogen tubes to the food item when the grill member is in contact with the food item. The grill also includes a temperature control device to control the radiant energy assembly for controlling radiant and visible light emitted by the radiant energy assembly.

In another related embodiment, there is provided a method of cooking a food item that includes the steps of configuring a grilling chamber with a highly reflective and low heat absorption inner surface that reflects radiant energy to a food item positioned therein, the grilling chamber configuration forming a convection heating process to speed up the cooking of the food item. The method also includes the step of directing radiant energy generated by a radiant energy assembly substantially in the visible light range of the electromagnetic spectrum at the food item, the food item receiving reflected radiant energy from the inner surface of the grilling chamber and receiving convection heat emitted from the radiant energy assembly. The method includes the step of supporting the food item on a grill member disposed within the grilling chamber formed from a heat conducting material that emits direct heat energy absorbed from the radiant energy assembly to the food item when in contact with the food item and includes controlling a temperature and visible light from the radiant energy assembly to simulate aesthetically an outdoor grilling appearance The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DESCRIPTION OF THE DRAWINGS

Other important objects and advantages of the invention will be apparent from the following detailed description of the invention taken in connection with the accompanying drawings in which:

FIGS. 2A-2B illustrate perspective and top views of the tabletop grilling appliance without the slotted platen in accordance with the teachings herein.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention are directed to an indoor/outdoor grill consisting of four major components: a grill base, a cooking surface, a heating element, and a cover. The heating elements are quartz tubes. The tubes are mounted in the grill base. Above the tubes, held by the base, is a slotted plate which acts as the cooking surface. The cooking surface is heated by convection and radiation, both provided by the quartz tubes. The desired food is placed on the cooking surface and the cooking surface is then covered. The food is cooked through conduction by the plate, convection by the heat of the cavity, and direct IR from the element. This provides more effective heating which creates quicker heat up, higher temperatures, and faster cooking times. Lastly, the light and IR emitted by the quartz tube provide similar aesthetics to current outdoor grills.

Figure 1A:
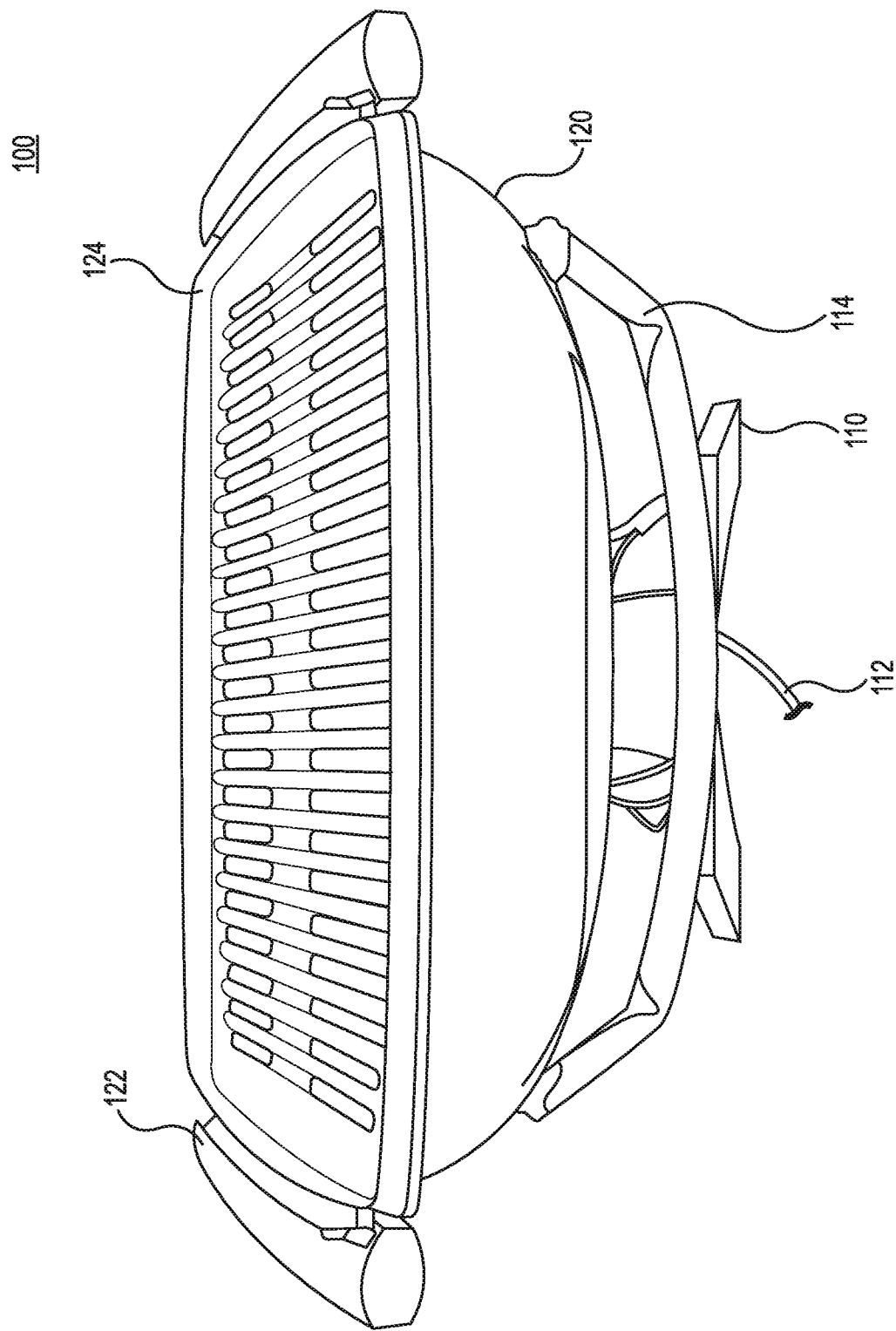
FIGS. 1A-1B illustrate a perspective and top views of a tabletop grilling appliance in accordance with the teachings herein.
Figure 1B:
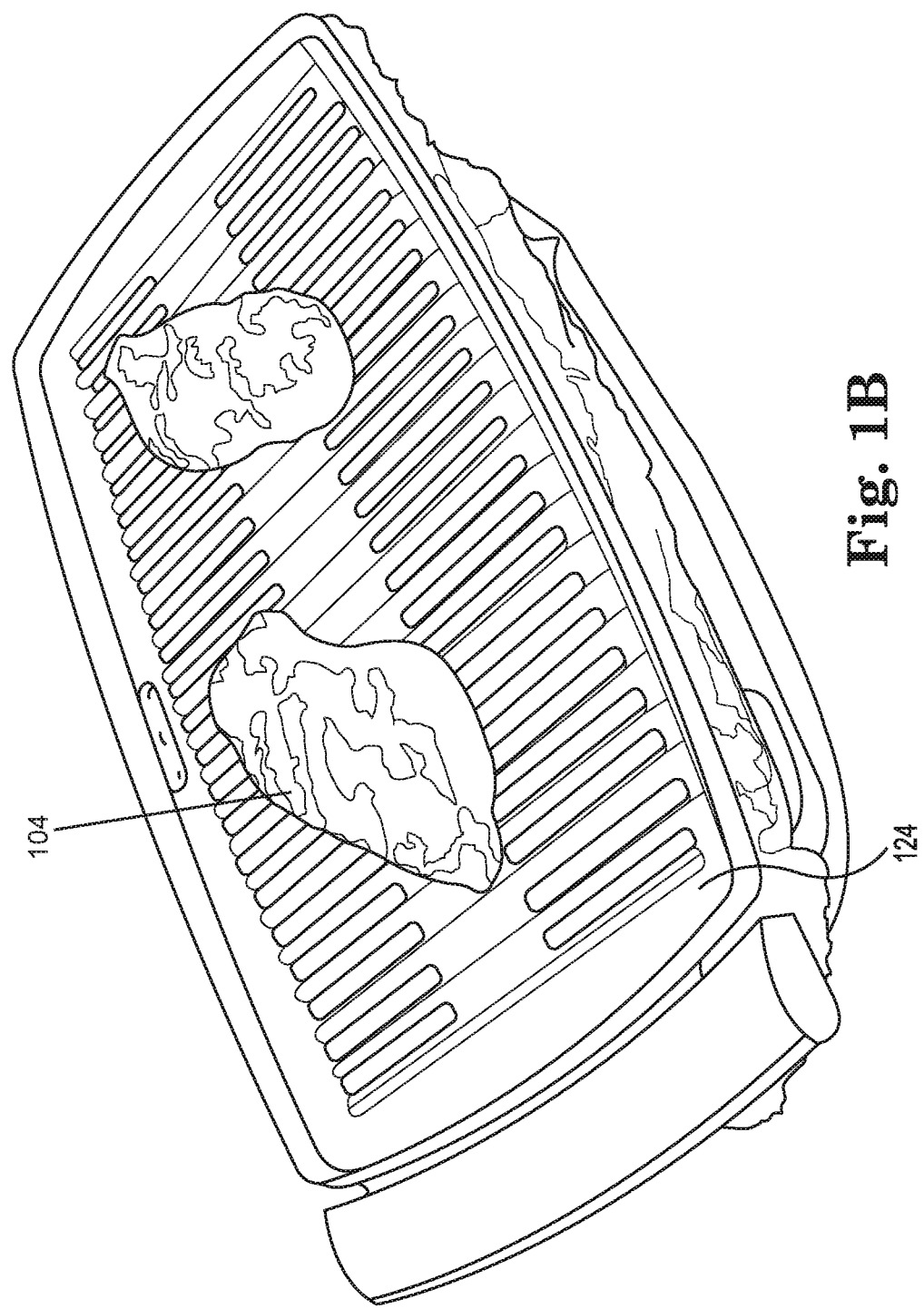
Figure 2A:
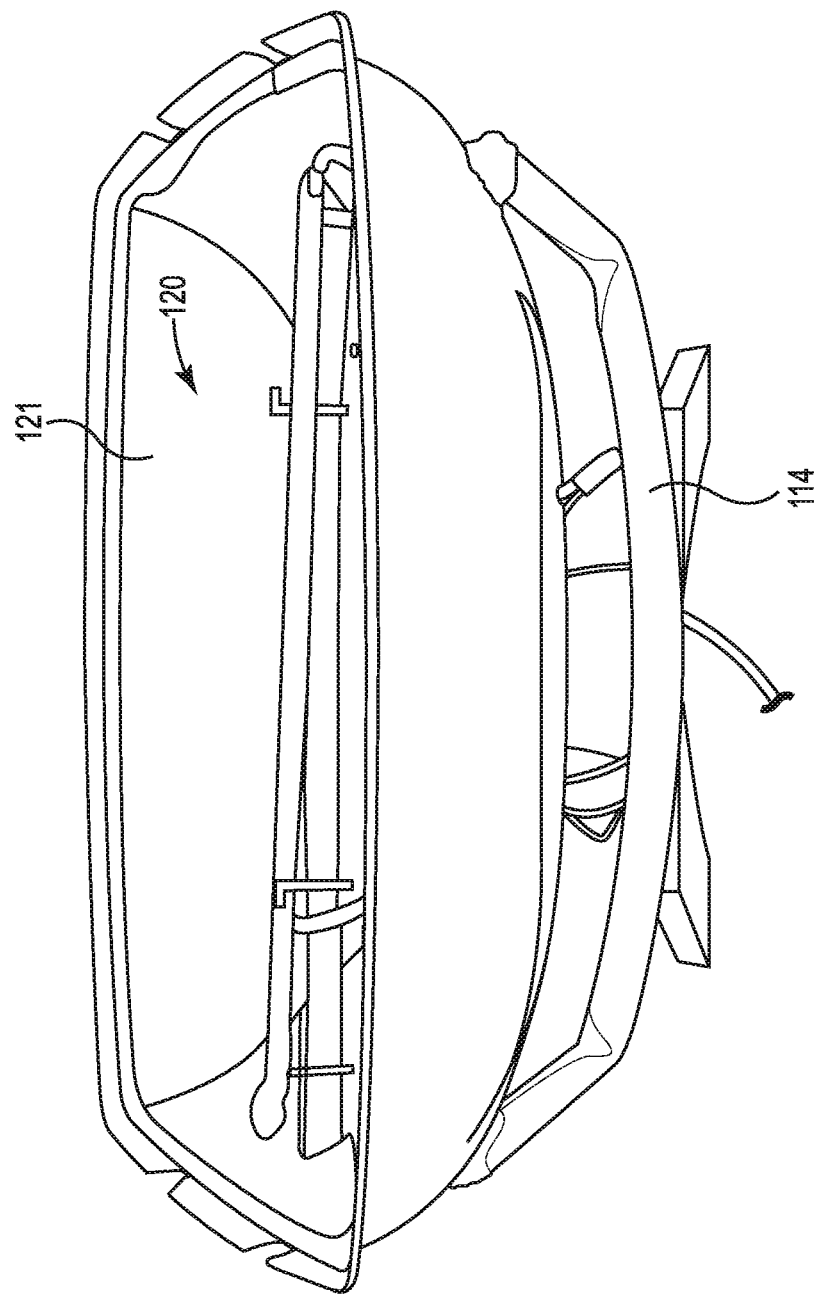

Referring now to the figures, FIGS. 1A-1B illustrate a perspective and top views of a tabletop grilling appliance 100 while FIGS. 2A-2B illustrate perspective and top views of tabletop grilling appliance 100 without a slotted platen or grill member in accordance with the teachings herein. In particular, tabletop grill 100 includes a grilling chamber 102 comprised of a top (not shown) and bottom 120 partial enclosures which form the grilling chamber. Bottom or grilling base 120 includes a grill stand 110, handles 122, a power source 112 (a power cord shown), a power conduit 114 that houses power lines to a radiant energy source assembly 128 (FIG. 2B) located within base 120, and a slotted platen or grill member 124 located over base 120 opening. In this example embodiment, base 120 has a highly reflective and low heat absorption inner surface 121 for reflecting radiant energy to a food item 104 positioned therein. Grilling chamber 102 is configured to direct emitted radiant energy in a convection manner about the food item (when the top or cover is on base 120) with radiant energy generating assembly 128 emitting a substantial portion of energy in the visible light range of the electromagnetic spectrum. In this example embodiment, radiant energy assembly 128 is positioned within grilling chamber 102 to direct radiant energy at the food item, the food item receiving reflected radiant energy from inner surface 121 of grilling chamber base 120 and subjected to convection heat from the emitted radiant energy.

Grilling appliance 100, in this example embodiment, also includes a grill member or slotted platen 124 for supporting the food item and is disposed within the grilling chamber (or over the opening of the base). Grill member 124 is formed of heat conducting material that emits direct heat energy absorbed from the radiant energy assembly to the food item when in contact with the food item. Grilling appliance 100 described herein captures the benefits of convection and direct radiant heat from radiant energy assembly 128 as well as direct heat via heating slotted grill plate 124 and reflected heat from inner surface 121, thereby providing a very efficient and fast grilling experience. Although not shown, grilling appliance 100 includes a temperature controller for controlling radiant energy assembly 128, which is not only for controlling the cooking temperature but also for controlling the visual/light output so as to resemble a traditional grilling experience (such as embers in a charcoal grill or light from flames in a gas grill).

In this example embodiment and referring to FIGS. 2A-2B, radiant energy generating assembly 128 comprises two quartz halogen tube lamps 128A and 128B located in a substantial end to end configuration within grilling base 120. Each of the quartz halogen tubes are connected to a power source via a heat element electrical connector 126 which his then connected to power source 112 covered by a power conduit 114. Although not shown, in this example embodiment, grill appliance 100 includes a temperature control device to control radiant energy assembly 128 for controlling radiant and visible light emitted by quartz halogen tubes 128A and 128B. The temperature control device controls the radiant and visible light emitted by first quartz halogen tube 128A and by second quartz halogen tube 128B, thereby allowing a user to select one or more operating states for each of the tubes: individual independent operation, timed operation, desired temperature and desired visual intensity.

In a related embodiment, radiant energy generating assembly 128 includes a quartz halogen tube lamp 128A which is configurable to extend the length of the grill base (not shown). In a related embodiment, radiant energy assembly 128 includes a quartz body tungsten lamp. The lamps are generally any of the quartz body, tungsten-halogen or high intensity discharge lamps commercially available, e.g., 1 KW, 120 VAC quartz-halogen lamps, which are about 7 to 7.5 inches long and cook with approximately fifty percent (50%) of the energy in the visible and near-visible light portion of the spectrum at full lamp power, and that can run off a 15 amp outlet. In the example embodiments described herein, the inner surface of the grilling chamber comprises a low heat and light absorption and highly reflective coating. In FIG. 2B, the inner surface of the grilling chamber includes a highly light reflective assembly 130A and 130B located under halogen tubes 128A and 128B, respectively. In a related embodiment, the highly reflective member(s) is configured to capture food particles falling from the grill or slotted platen 124. In various embodiments, grilling chamber 102 is selected from the group consisting of a two-piece mating configuration, a clamshell configuration and an enclosure with a front door configuration (similar to a toaster oven).

In a related embodiment, a method of cooking a food item utilizing a radiant energy source and a grilling chamber design that promotes rapid cooking due to the efficient use of the heating energy provided. The method includes configuring a grilling chamber 102 with a highly reflective and low heat absorption inner surface (or assembly) that reflects radiant energy to a food item positioned therein, the grilling chamber configuration forming a convection heating process to speed up the cooking of the food item. The method also includes directing radiant energy generated by a radiant energy assembly 128 substantially in the visible light range of the electromagnetic spectrum at the food item, the food item receiving reflected radiant energy from the inner surface of the grilling chamber and receiving convection heat emitted from the radiant energy assembly 128. The method further includes supporting the food item on a grill member or slotted platen 124 disposed within grilling chamber base 120 formed from a heat conducting material that emits direct heat energy absorbed from radiant energy assembly 128 to the food item when in contact with the food item. The method furthermore includes controlling a temperature and visible light from the radiant energy assembly to simulate aesthetically an outdoor grilling appearance.

In a typical bonfire, the color of the flames can range from White/Yellow (very hot), which is visible to the human at about 570 nm; to Orange (hot) and visible to the human at about 590 nm; down to Red (warm) which is visible from about 650 nm-690 nm. These various colors can have the following actual heat temperatures emanating from the quart halogen tube(s) while cooking: Red: Just visible: 525° C. (980° F.); Dull: 700° C. (1,300° F.); Cherry, dull: 800° C. (1,500° F.); Cherry, full: 900° C. (1,700° F.); and Cherry, clear: 1,000° C. (1,800° F.). Orange: Deep: 1,100° C. (2,000° F.): Clear: 1,200° C. (2,200° F.); and White: Whitish: 1,300° C. (2,400° F.); Bright: 1,400° C. (2,600° F.); Dazzling: 1,500° C. (2,700° F.). Therefore, the tabletop grill, in one example embodiment, includes a controller that allows a user to vary the "heat" by color perceived by the user as when cooking in a bonfire. The controller is programmed such that it correlates the visible color of the "heat" from the quartz tube and power being delivered to the quartz tube (which can include a voltage-varying circuit or variable resistor).

The following patents and publications are incorporated by reference in their entireties: U.S. Pat. Nos. 4,700,051; 5,517,005; 5,990,454; and 6,369,367.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A tabletop grill for cooking food comprising:
   a grilling chamber having a highly reflective and low heat absorption inner surface for reflecting radiant energy to a food item positioned therein, the grilling chamber configured to direct emitted radiant energy in a convection manner about the food item;
   at least one radiant energy generating element connected with a power circuit and emitting a substantial portion of energy in the visible light range of the electromagnetic spectrum, the radiant energy element operatively supported and positioned within the grilling chamber to direct radiant energy at the food item, the food item also receiving reflected radiant energy from the inner surface of the grilling chamber and subjected to convection heat from the emitted radiant energy;
   a grill member for supporting the food item and disposed within the grilling chamber, the grill member having plural openings for radiant energy to impinge on the food item and formed of heat conducting material that conducts heat energy absorbed from the radiant energy generating element to the food item when in contact with the food item; and
   a temperature controller for controlling the temperature within the grilling chamber by varying the power to the radiant energy generating element and thus the radiant energy emitted for cooking the food item while also varying the color of the visible light that is also emitted and visible through the plural openings of the grill member, the color of visible light emitted being correlated by the controller with the radiant energy emitted to provide a visible indication of temperature to a user.

2. The grill according to claim 1 wherein the radiant energy generating element comprises a quartz halogen tube lamp.

3. The grill according to claim 1 wherein a plurality of radiant energy generating elements are provided, wherein each radiant energy generating element comprises a quartz halogen tube with at least two quartz halogen tubes located in a substantial end to end configuration.

4. The grill according to claim 1 wherein the radiant energy generating assembly comprises a quartz body tungsten lamp.

5. The grill according to claim 1 wherein the inner surface of the grilling chamber comprises a low heat and light absorption and highly reflective coating.

6. The grill according to claim 1 wherein the inner surface of the grilling chamber further comprises a highly reflective member located under the radiant energy assembly.

7. The grill according to claim 6 wherein the highly reflective member is configured to capture food particles falling from the grill or slotted platen.

8. The grill according to claim 3 wherein the temperature controller controls the radiant energy assembly for controlling radiant and visible light emitted by a first quartz halogen tube and by a second quartz halogen tube by one or more of the selected operating states: independent, timed operation, temperature and visual intensity.

9. The grill according to claim 1 wherein the grilling chamber is selected from the group consisting of a two-piece mating configuration, a clamshell configuration and an enclosure with a front door configuration.

10. A grill for cooking food comprising:

a grilling chamber having a highly reflective and low heat absorption inner surface for reflecting radiant energy to a food item positioned therein, the grilling chamber configured to direct emitted radiant energy in a convection manner about the food item;

at least one radiant energy generating element connected with a power circuit and emitting a substantial portion of energy in the visible light range of the electromagnetic spectrum comprising at least two quartz halogen tubes mounted in a substantially end to end configuration, the quartz halogen tubes operatively supported and positioned within the grilling chamber to direct radiant energy at the food item, the food item also receiving reflected radiant energy from the inner surface of the grilling chamber and subjected to convection heat from the emitted radiant energy;

a grill member for supporting the food item and disposed within the grilling chamber, the grill member having plural openings for radiant energy to impinge on the food item and formed of heat conducting material that conducts heat energy absorbed from each of the quartz halogen tubes to the food item when in contact with the food item; and a temperature controller for controlling the temperature within the grilling chamber by varying the power to the radiant energy generating element and thus the radiant energy emitted for cooking the food item while also varying the color of the visible light that is also emitted and visible through the plural openings of the grill member, the color of visible light emitted being correlated by the controller with the radiant energy emitted to provide a visible indication of temperature to a user.

11. The grill according to claim 10 wherein the temperature controller controls each quartz halogen tube so as to provide one or more of the selected operating states: independent, timed operation, temperature and visual intensity.

12. The grill according to claim 11 wherein the inner surface of the grilling chamber comprises a low heat and light absorption and highly reflective coating.

13. The grill according to claim 10 wherein the grilling chamber is selected from the group consisting of a two-piece mating configuration, a clamshell configuration and an enclosure with a front door configuration.

14. A method of cooking a food item using a tabletop grill that comprises a grilling chamber having a highly reflective and low heat absorption inner surface for reflecting radiant energy to a food item positioned therein, at least one radiant energy generating element connected with a power circuit and emitting a substantial portion of energy in the visible light range of the electromagnetic spectrum, a grill member for supporting the food item and disposed within the grilling chamber, the grill member having plural openings for radiant energy to impinge on the food item and formed of heat conducting material that conducts heat energy absorbed from the radiant energy generating element to the food item when in contact with the food item; and a controller for controlling the temperature within the grilling, the method comprising the steps of:

supporting a food item on the grill member;

setting a power level for a level of radiant energy and a predetermined color of visible light to each be emitted from the at least one radiant energy generating element;

supplying power to the at least one radiant energy generating element with the controller and thereby generating radiant energy and cooking the food item by the radiant energy while at the same time correlating the radiant energy to the predetermined color of visible light and generating the visible light at the predetermined color that is correlated by the controller for thus providing a visual indication of temperature to a user.

15. The method of claim 14 including the step of varying the power to the radiant energy generating element by the controller and thus the radiant energy emitted for cooking the food item while also varying the color of the visible light that is also emitted and visible through the plural openings of the grill member to provide the visible indication of temperature to a user.

* * * * *